United States Patent [19]
Leavitt et al.

[11] 3,741,650
[45] June 26, 1973

[54] FILM HANDLING METHOD AND APPARATUS

[75] Inventors: Minard A. Leavitt, Sepulveda; Poul B. Roulund, El Toro, both of Calif.

[73] Assignee: Cutler-Hammer, Inc., Milwaukee, Wis.

[22] Filed: Feb. 11, 1971

[21] Appl. No.: 114,600

Related U.S. Application Data

[63] Continuation-in-part of Ser. No. 27,690, April 13, 1970.

[52] U.S. Cl.................. 355/91, 226/7, 226/97, 226/109
[51] Int. Cl. ............................................ G03b 27/20
[58] Field of Search........................ 226/97, 7, 109; 355/90, 91

[56] References Cited
UNITED STATES PATENTS

| | | | |
|---|---|---|---|
| 2,848,820 | 8/1958 | Wallin et al. | 226/97 X |
| 3,468,606 | 9/1969 | Wolf et al. | 226/97 UX |
| 3,574,460 | 4/1971 | Snaper & Gibson | 355/91 |

*Primary Examiner*—Allen N. Knowles
*Assistant Examiner*—Gene A. Church
*Attorney*—Christie, Parker & Hale

[57] ABSTRACT

One side of a pair of adjacent film lengths is supported by a platen of microporous material through which air is forced into the space between the platen and the film. A trough-shaped housing encloses the space on the other side of the film lengths except for the film edges. A fluid having a large static head is introduced into the space between the housing and the film. The housing has a center portion that is spaced a large distance from the film, i.e., a sufficient distance to maintain a high static head over the entire length of the housing. The housing also has transverse sides that are spaced a small distance from the film edges and the surface of the platen, i.e., a sufficiently small distance to form a constriction in the fluid flowing out of the housing transversely to the film lengths. The housing is transparent. Light from a source is coupled through the housing to the film, thereby exposing it.

36 Claims, 10 Drawing Figures

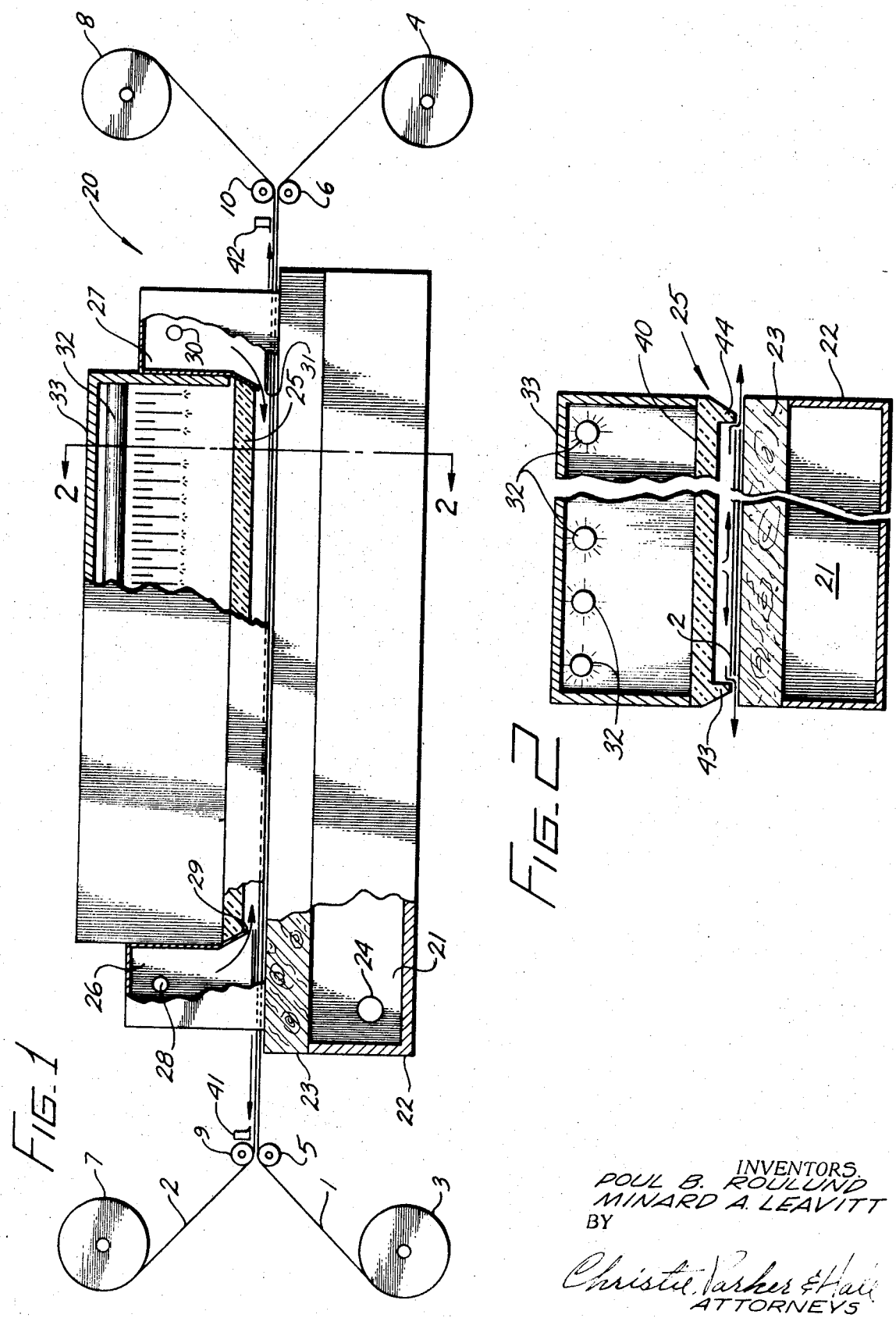

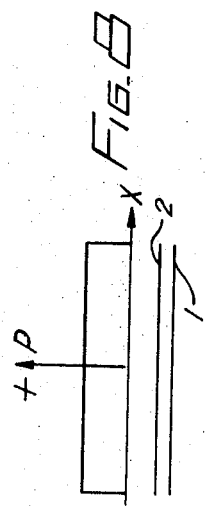
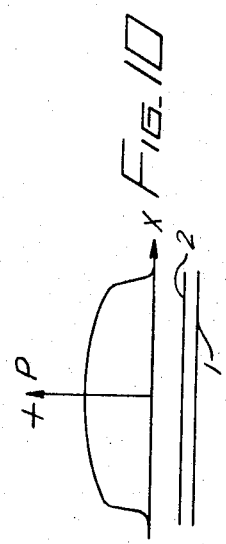
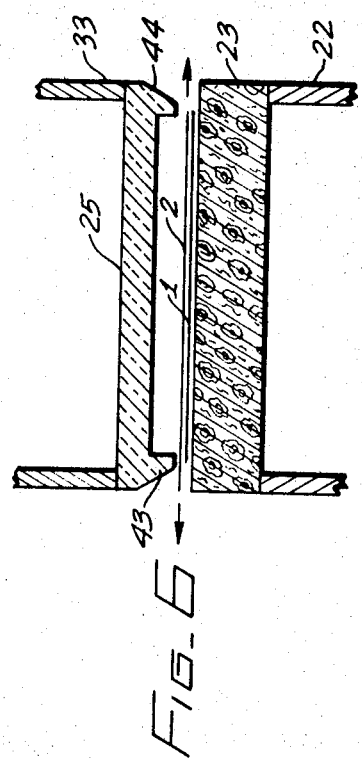
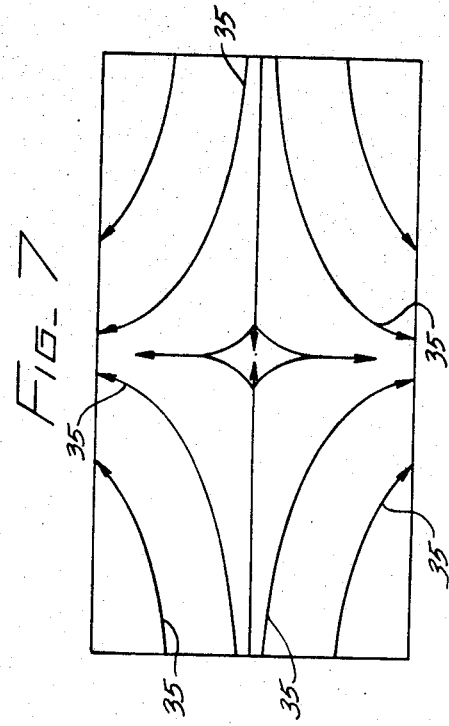
INVENTOR.
POUL B. ROULUND
MINARD A. LEAVITT
BY
Christie, Parker & Hale
ATTORNEYS

FILM HANDLING METHOD AND APPARATUS

CROSS-REFERENCE TO RELATED APPLICATION

This application is a continuation-in-part of a co-pending application, Ser. No. 27,690, filed Apr. 13, 1970.

BACKGROUND OF THE INVENTION

This invention relates to film handling and, more particularly, to the support and control of film during transport by means of fluid.

In the technology of film and tape handling, it is common practice to employ fluid such as air to support and control the film during its transport. It has been found film handling components that use air support can produce much less wear than film handling components that physically contact the film as it moves. One of the many film handling functions performed by air is the bringing of a length of unexposed film and a film transparency together for the purpose of contact printing. An intimate non-slipping contact must be established between the film lengths in the region where exposure takes place in order to transfer an image having high resolution. An example of a contact printer employing air to perform this function is disclosed in Timares et al. U.S. Pat. No. 3,161,120, which issued Dec. 15, 1964, to the assignee of the present application. The lengths of film to be brought together pass between two adjacent platens having tiny holes in their surfaces. Air from a high pressure source is forced through the holes and against the nonadjacent sides of the film lengths to form air cushions that suspend the film lengths in intimate contact midway between the platens. One or more transverse slotted windows are formed in one platen to permit the passage of light to the suspended film lengths.

A serious problem that arises in the known contact printers is the entrapment of boundary layer air between the film lengths. This air permits the film lengths to slip relative to each other and also destroys the intimate contacting relationship between them, thereby impairing the printing operation.

SUMMARY OF THE INVENTION

The invention contemplates the prevention of fluid entrapment between a pair of fluid supported film lengths by creating a low pressure region longitudinally along both edges of the film lengths. It has been found that the formation of such a low pressure region along both film edges draws from between the films any fluid which might otherwise become entrapped there. Preferably, the transverse pressure profile on one nonadjacent side of the film lengths is stepped; the pressure across the width of the film has a high value that drops off gradually from the center edgeward and then the pressure drops off sharply to ambient pressure near both edges of the film.

A large static head is formed over one nonadjacent side of the film lengths. At both edges of the one nonadjacent side of the film lengths there are formed constricted passages for fluid escape, thereby converting the static head to a velocity head. This conversion results in a stepped pressure profile at the film edges.

Specifically, an elongated housing encloses the space around one nonadjacent side of the film lengths except for two narrow longitudinal exits along the edges of the same portion of the film lengths. Fluid under pressure is introduced into the enclosed space. The cross-sectional area of the enclosed space transverse to the film lengths is large relative to the longitudinal exits, so the fluid in the enclosed space over the film has a large static head. The fluid flowing laterally through the exits experiences a constriction along both film edges, thereby giving rise to a sharp pressure drop.

Preferably, the housing is trough-shaped, having a cross-sectionally flat center portion and transverse sides that are spaced from the edges of the film lengths a distance that is substantially less than the spacing between the center portion and the film lengths. A platen of microporous material is disposed along the other non-adjacent side of the film lengths and fluid is forced through the platen to form a fluid cushion that supports that side of the film lengths. The ends of the trough sides are also spaced from the platen a distance that is substantially less than the spacing between the center portion and the film lengths.

The large static fluid head in the housing exerts on the film lengths a force that maintains them in intimate nonslipping contact over the entire length of the housing. By making the housing from transparent material, a window for exposing the film is formed that can be extremely long. Further, the sharp pressure drop at both edges of the film lengths prevents the entrapment of fluid between the film lengths. Assuming the film supporting fluid is air, the inventive technique provides the described film support without appreciable condensation of moisture or abrasion.

If the application of the invention requires that one of the transverse sides of the trough-shaped housing must be spaced inwardly from the film edge further than the other transverse side the former transverse side is made longer than the latter in order to reduce the width of the exit it forms with the film. Consequently, the lateral forces exerted on the film by the fluid escaping through the exits are balanced.

BRIEF DESCRIPTION OF THE DRAWINGS

The features of several specific embodiments of the best mode contemplated of carrying out the invention are illustrated in the drawings, in which:

FIG. 1 is a side elevation view of one embodiment of a contact printer that incorporates the principles of the invention;

FIG. 2 is a front elevation view in section of the embodiment of FIG. 1;

FIG. 6 is a front elevation view in section of a modification of the embodiment of FIGS. 1 and 2;

FIG. 7 is a top plan view of the interior of the housing of FIG. 1 depicting the fluid characteristics in the space within the along the same portion of the lengths of films 1 and 2, housing; and FIGS. 8, 9, and 10 are graphs depicting several transverse pressure profiles used to practice the invention.

DETAILED DESCRIPTION OF THE SPECIFIC EMBODIMENTS

Figure 3:
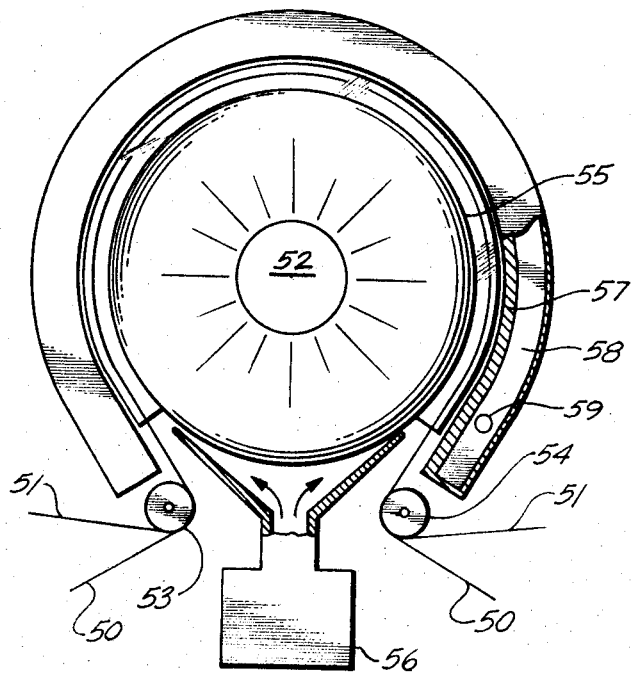
FIG. 3 is a side elevation view of another embodiment of a contact printer that incorporates the principles of the invention.

In FIG. 1, a length of unexposed film 1 and a length of negative master film 2 are shown. Film 1 is stored on rotatably supported reels 3 and 4 between which it is guided by guide rollers 5 and 6. Similarly, film 2 is stored on rotatably supported reels 7 and 8 between which it is guided into adjacent position to film 1 by guide rollers 9 and 10. A contact printer 20 is disposed in the path of films 1 and 2 between guide rollers 5 and 9 and guide rollers 6 and 10. The function of contact printer 20 is to hold films 1 and 2 in intimate nonslipping contact with each other as they are transported between storage reels by means not shown. While the films are in intimate contact, the image on film 2 is transferred to film 1 by photographic techniques.

Contact printer 20 has a plenum chamber 21 defined by a housing 22 that is open at the top and a platen 23 that covers the opening in housing 22. Film 1 extends across the flat upper surface of platen 23. Air is supplied to chamber 21 through an inlet 24 and is maintained by chamber 21 at a pressure substantially above the ambient pressure. Platen 23 is made from a microporous material such as cast Tamastone, oilite, filter porcelain, or a porous sintered metal. As a result, there are formed through platen 23 a very large number of multidirectional escape paths for air from chamber 21. Because of the high resistance of the porous material comprising platen 23, air flows out of plenum chamber 21 at a very low rate and undergoes a very large pressure drop across platen 23. Thus, the air, substantially at zero velocity as it leaves platen 23, forms an air cushion under film 1 that supports films 1 and 2 in spaced relationship from the upper surface of platen 23.

An elongated trough-shaped housing 25 partially encloses the space over films 1 and 2 where they pass across platen 23. Housing 25 is made from a transparent material. Plenum chambers 26 and 27 are disposed at opposite ends of housing 25. Plenum chamber 26 has an inlet 28 that supplies air at high pressure and a slot shaped exit 29 through which air flows into the space between film 2 and housing 25. Similarly, plenum chamber 27 has an inlet 30 that supplies air at high pressure and a slot shaped exit 31 through which air passes into the space between film 2 and housing 25. Lamps 32, which generate light having a high intensity, are mounted within an encosure 33. Enclosure 33 is disposed above housing 25 and directs the light from lamps 32 through housing 25 onto the surface of film 2. The light passes through the transparent areas of film 2 to expose the corresponding areas of film 1. Preferably, short lengths of housing 25 on either end are painted so they are opaque. In this way, the film is not exposed until it is under housing 25 a sufficient time to become stabilized.

As illustrated by FIG. 2, housing 25 has a cross-sectionally flat center portion 40 that is uniformly spaced from the non-adjacent side of film 2 to form a wide longitudinal channel. In addition to center portion 40, housing 25 has transverse sides 43 and 44 that are spaced from both edges of films 1 and 2 and from the upper surface of platen 23, as depicted in FIG. 2. Thus, housing 25 forms narrow longitudinal exits through which the air entering from plenum chambers 26 and 27 escapes as it travels along the length of the space enclosed by housing 25. Transverse sides 43 and 44 are spaced a much smaller distance from the edges of films 1 and 2 than center portion 40 is spaced from the nonadjacent side of film 2. Similarly, the ends of transverse sides 43 and 44 are also spaced a much smaller distance from the surface of platen 23 than center portion 40 is spaced from the nonadjacent side of film 2. Consequently, the air that flows laterally out of the longitudinal exits in housing 25, which is depicted by the arrows in FIG. 2, is constricted by the ends of films 1 and 2, transverse sides 43 and 44, and the surface of platen 23. The constriction in air flow occurring at the longitudinal exits causes the air to flow through the wide longitudinal channel above the nonadjacent side of film 2 at a low velocity. Consequently, a high static head forms throughout the longitudinal channel to hold films 1 and 2 in intimate contact. Films 1 and 2 are shown spaced apart in FIG. 2 only for the purpose of illustrating two films. The direction of air flow and the static pressure in the longitudinal channel are represented in FIG. 7. As depicted by flow lines 35, part of the air leaving exits 29 and 31 flows in a curved path toward transverse sides 43 and 44, while the remainder of the air flows to the center of the length of housing 25, collides with the air flowing from the other end, and then moves laterally toward transverse sides 43 and 44.

In accordance with the Venturi principle, the constriction in air flow at the longitudinal exits also results in a sharp pressure drop at the edges of films 1 and 2. In other words, the cross-sectional area for fluid flow through the longitudinal exits is much smaller than the cross-sectional area for fluid flow through the wide channel between center portion 40 and the nonadjacent surface of film 2, so the fluid velocity increases and the pressure drops at the constriction. In summary, the static head is converted to a velocity head at the longitudinal exits to effect a sharp drop in the downward force exerted on film 2.

The large static head, i.e., the pressure maintained over the nonadjacent side of film 2 in the wide channel within housing 25 keeps films 1 and 2 in intimate nonslipping contact due to the downward force it exerts. By appropriate modifications in the dimensions of housing 25 and the way air is injected into the space enclosed by housing 25, an effective downwardly directed velocity head can be produced in housing 25 to augment the force exerted by the static head.

By way of example, the distance between center portion 40 and the surface of platen 23 could be 0.25 inches, the distance between the ends of transverse sides 43 and 44 and the surface of platen 23 could be 0.012 inches, the distance between each edge of films 1 and 2 and each transverse side (43 and 44) could be 0.010 inches, and the width of films 1 and 2 could be 70 millimeters. In an embodiment of the invention exhibiting these exemplary dimensions, it has been found that a sufficiently large static head can be developed to maintain two film lengths in intimate nonslipping contact without the entrapment of air between the films. Further, only one of the films must actually be driven; the other film can be transported by virtue of the frictional force between them. Consequently, a single master film can be used longer because it would not have to be directly driven; it can be transported by the film to be exposed.

In FIGS. 8, 9, and 10 several transverse pressure profiles in the space enclosed by housing 25 are depicted graphically. The static pressure is represented in the graphs by the ordinate and the displacement from the center of the film is represented by the abscissa. Films 1 and 2 are also represented to show their position relative to the pressure profile. From the point of view of obtaining the largest force over the nonadjacent surface of film 2 and, therefore, the best film contact, the pressure profile shown in FIG. 8 is desirable. In this case, the static pressure is at a uniformly high value in the space above films 1 and 2 and drops sharply to the ambient pressure (or possibly a pressure even lower than ambient) precisely at the edges of films 1 and 2. From the point of view of preventing the entrapment of air between the films, the pressure profile in FIG. 9 is desirable. In this case, the static pressure is at a high value in the space above the centers of films 1 and 2 and drops off uniformly to the ambient pressure at the edges of films 1 and 2, thereby forcing entrapped air to film edges. From both these points of view, the pressure profile in FIG. 10 is desirable. In this case, the static pressure is convexed, having a high value in the space above films 1 and 2 that drops off gradually from the film center edgeward and then drops off sharply to the ambient pressure as near as practical to the edges of films 1 and 2. The pressure profile is determined by the distance from center portion 40 to platen 23, by the distance from transverse sides 43 and 44 to platen 23, and by the way in which air is injected into the space enclosed by housing 25 from plenum chambers 26 and 27.

The placement of transverse sides 43 and 44 outwardly of the film edges, as depicted in FIG. 2, is dictated by the requirement that the films be held in intimate contact over their entire width. If it is not necessary to hold the films in intimate contact over their entire width because the image on master film 2 is formated so a border is formed between the image and the film edge, it may be desirable to design housing 25 so transverse sides 43 and 44 are disposed inwardly from the film edge. This ensures that the static pressure profile is at ambient pressure at the film edge. When transverse sides 43 and 44 are disposed outwardly of the film edges, it is more difficult to ensure that the space immediately adjacent to the film edges is at ambient pressure. In FIG. 6, a modification of the arrangement of FIGS. 1 and 2 is shown. Film 2 has been modified so it is wider than film 1, the extra width being provided with sprocket holes for transport purposes. It is also assumed the film is formated so it is not necessary to contact print to the film edge, i.e., the film has a border at its edges. The extra width of film 2 results in a greater surface area across which the air must pass in flowing to the left, as viewed in FIG. 6, vis-a-vis, the flow of air to the right. This tends to give rise to an imbalance of the lateral forces, i.e., the forces in the directions of the arrows in FIG. 6, exerted on film 2 by the flow of air along its surface. In FIG. 6, transverse sides 43 and 44 are disposed inwardly of the edges of films 1 and 2 to ensure the film edges are at ambient pressure. In addition, the space between the end of transverse side 43 and platen 23 is slightly smaller than the space between the end of transverse side 44 and platen 23. In other words, side 43 is longer than side 44. Thus, the longitudinal exit on the left side of the film as viewed in FIG. 6, is narrower than the longitudinal exit on the right side of the film. By proper design of the discrepancy in the width of the longitudinal exits, the lateral forces exerted on film 2 by the flow of air along its surface can be balanced.

In FIG. 3, a contact printer is shown that makes particularly efficient use of a cylindrical light source 52. A negative master film 50 and an unexposed film 51 are directed around light source 52 by guide rollers 53 and 54. A cylindrical housing 55 encloses light source 52. Housing 55 has a transparent cylindrical center portion corresponding to center portion 40 in FIG. 2 and annular ribs corresponding to transverse sides 43 and 44 in FIG. 2. The ends of housing 55 are opaque to light so all the light from source 52 is directed through the cylindrical center portion. Thus, housing 55 encloses the space on the nonadjacent side of film 50 in the same fashion as housing 25 in FIGS. 1 and 2 and a radial cross-sectional view of housing 55 is identical to FIG. 2. Air having a high static head is directed by a source 56 into the ends of housing 55 so that a high static pressure is exerted outwardly on the nonadjacent side of film 50 over substantially the entire perimeter of housing 55. A cylindrical platen 57, which is made of microporous material, is spaced from the nonadjacent surface of film 51. Air supplied through an inlet 59 to a plenum chamber 58 escapes through platen 57 and forms an air cushion at the nonadjacent side of film 51. In short, the embodiment of FIG. 3 is a cylindrical equivalent of the embodiment of FIGS. 1 and 2. It permits more efficient use of a cylindrical or nondirectional light source because virtually all the light emanating from the source impinges directly on the films to be exposed.

Figure 4:
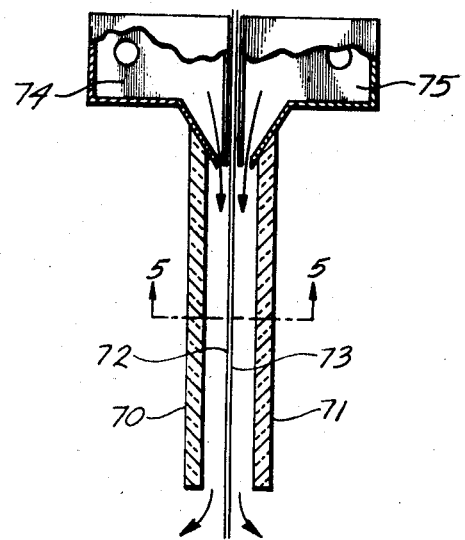
FIG. 4 is a side elevation view of film support apparatus that incorporates the principles of the invention.
Figure 5:
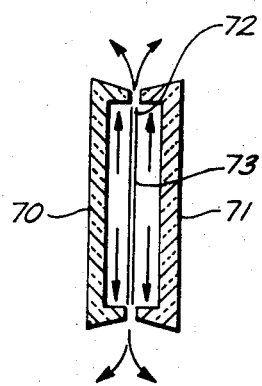
FIG. 5 is a bottom sectional view of the apparatus of FIG. 4.

FIGS. 4 and 5 show film suporting apparatus employing the principles of the invention. Housings 70 and 71, each of which is identical to housing 25 of FIGS. 1 and 2, are disposed on the nonadjacent sides of films 72 and 73. Plenum chambers 74 and 75 supply air having a high static head at one end of housings 70 and 71, respectively. In this embodiment, a high pressure is exerted on the nonadjacent sides of both films.

Although the invention as disclosed has particular importance in connection with the support of two lengths of film in intimate nonslipping contact, it could also be employed to support a single length of film. The term "film" as used in this specification includes all elongated, flexible, ribbon-like material such as magnetic tape, paper tape, and photographic film. Further, the invention can be used in connection with other fluids than air. The invention can be employed in a printing operation where the film is transported continuously or advanced in discrete steps; further, it can be utilized to perform other operations in which intimate contact between two ribbon-like lengths of material must be maintained.

What is claimed is:

1. Apparatus for handling a film length comprising:
    means for supporting one side of the film length;
    an elongated housing enclosing the space on the other side of the film length except for film edges, the housing being shaped to form a space reduction near each film edge along the same portion of the film length; and
    means for directing a fluid having a high head into the space between the housing and the other side of the film length so a small quantity of the fluid flows laterally across the other side of the film length, is constricted at the space reductions, and escapes from the housing along the film edges.

2. The apparatus of claim 1, in which the means for supporting one side of the film length comprises an elongated platen of microporous material adjacent to the one side of the film length and means for forcing support air through the platen to form a space between the platen and the one side of the film length.

3. The apparatus of claim 1, in which the means for supporting one side of the film length comprises another elongated housing enclosing the space on the one side of the film length except for the film edges, the housing being shaped to form a space reduction near each film edge, and means for introducing into the sapce between the other housing and the one side of the film length a fluid having a high static head such that a small quantity of the fluid flows laterally across the one side of the film length, is constricted at the space reductions, and escapes from the housing along the film edges.

4. The apparatus of claim 1, in which the housing has a first elongated surface adjacent to and spaced an appreciable distance from the other side of the film length, the first surface being slightly wider than the film; a second elongated surface spaced a short distance from one film edge, the second surface extending transversely away from the first surface to form with the adjacent film edge an elongated passage that is narrower than the space between the first surface and the other side of the film length; and a third elongated surface spaced a short distance from the other film edge, the third surface extending transversely away from the first surface to form with the adjacent film edge an elongated passage that is narrower than the space between the first surface and the other side of the film length.

5. The apparatus of claim 4, in which the means for supporting one side of the film length includes an elongated platen spaced from the one side of the film length, the platen being spaced a short distance from the ends of the second and third surfaces.

6. The apparatus of claim 1, in which the housing comprises an elongated trough having a cross sectionally flat center portion that is spaced from the other side of the film length a sufficient distance to maintain a high static head over the entire length of the trough and transverse sides that are spaced from the edges of the film length.

7. The apparatus of claim 6, in which the sides of the trough are spaced a substantially smaller distance from the edges of the film length than the center portion is spaced from the other side of the film length.

8. The apparatus of claim 7, in which the means for supporting one side of the film length includes a microporous platen extending along the film length adjacent the ends of the trough sides, the distance between the surface and the ends of the trough sides being substantially smaller than the distance between the other side of the film length and the center portion of the trough, and means for forcing air through the platen into the space between the platen and the one side of the film length.

9. The apparatus of claim 7, in which the means for supporting one side of the film length includes a surface extending along the film length adjacent the ends of the trough sides, the distance between the surface and the ends of the trough sides being substantially smaller than the distance between the other side of the film length and the center portion of the trough.

10. Film handling apparatus comprising:
a first length of film upon which information is stored in a given form;
a second length of film capable of storing information in the given form;
means for guiding the first and second lengths of film so they remain aligned with and adjacent to each other over a portion of their paths;
means for supporting the nonadjacent side of the first film length over the portion;
an elongated housing enclosing the space around the nonadjacent side of the second film length over the portion except for an exit along both edges of the film lengths over the portion that produces a constriction in the fluid flowing laterally out of the housing;
means for introducing fluid having a large static head into the enclosed space, the cross-sectional area of the enclosed space transverse to the film lengths being large enough to support the static head without appreciable reduction over the lengths of the enclosed space; and
means for transferring the information stored on the first length of film to the second length of film while the lengths of film are in the portion of their paths.

11. The apparatus of claim 10, in which the length of the housing is flat and the film lengths are guided so they are flat along the portion of their lengths within the housing.

12. The apparatus of claim 10, in which the housing is a light transparent cylinder, the film lengths are guided in a path that extends around the cylinder, the means for supporting the one side of the pair of film lengths urges the film lengths toward the cylinder, and a light source that is substantially nondirectional in at least one plane is provided within the cylinder.

13. The apparatus of claim 10, in which the housing is open at at least one end to permit the escape of the fluid directed along the film length.

14. The apparatus of claim 10, in which the means for supporting the portion of the nonadjacent side of the first film length comprises an elongated platen of microporous material spaced a short distance from the first film length and the means for forcing air through the platen into the space between the platen and the nonadjacent side of the first film length.

15. The apparatus of claim 10, in which the housing comprises an elongated trough enclosing the film lengths on three sides, the trough having a center portion that is spaced from the nonadjacent side of the second film length a sufficient distance to maintain a high static head over the entire length of the trough and transverse sides that are spaced from the edges of the film lengths.

16. Apparatus for holding a pair of adjacent film lengths in intimate contact with each other, the apparatus comprising:
means for supporting one side of the pair of film lengths;
first means for guiding fluid along the other side of the film lengths without appreciable loss in static head; and
second means for guiding the fluid transverse to the other side of the film lengths to form constrictions in the fluid flow at both film edges along the same portion of the film lengths such that an appreciable loss in static head takes place thereat.

17. The apparatus of claim 16, in which the first guiding means comprises an elongated surface spaced a substantial uniform distance from the other side of the film lengths and the second guiding means comprises second and third elongated surfaces extending transversely away from the first surface toward the respective film edges, the second and third surfaces being spaced from the respective film edges a distance that is substantially smaller than the first distance.

18. The apparatus of claim 17, in which the means for supporting one side of the pair of film lengths comprises an elongated platen of microporous material spaced a short distance from the one side of the film lengths, the distance between the ends of the transverse sides and the platen being substantially less than the distance from the other side of the film to the center portion of the trough, and means for forcing air through the platen into the space between the platen and the one side of the film length.

19. The apparatus of claim 18, in which at least a portion of the trough is transparent and a source of light is provided to expose the film lengths adjacent the transparent portion of the trough.

20. The apparatus of claim 19, in which at least one end of the trough is open to permit the escape of the fluid directed along the other side of the film lengths.

21. The apparatus of claim 10, in which a portion of the housing is light transparent to form a window in the housing and a source of light is provided adjacent the window to expose the film lengths to light through the window.

22. Film handling apparatus comprising:
a first length of film;
a second length of film;
means for guiding the first and second lengths of film through an atmosphere so they remain aligned with and adjacent to each other over a portion of their paths;
means for supporting the portion of the nonadjacent side of the first length of film;
means for producing a first fluid pressure higher than the atmosphere against the portion of the nonadjacent side of the second length of film; and
means for producing a second fluid pressure lower than the first pressure against the portion of the nonadjacent side of the second length of film at both edges.

23. A method for holding two lengths of film in intimate contact with each other over a portion of their paths to transfer information stored on one of the lengths of film to the other length of film, the method comprising the steps of:
guiding the lengths of film so they are adjacent to each other over the portion of their paths;
supporting a portion of the nonadjacent side of one of the lengths of film over the portion of the paths;
producing a high static fluid head that communicates with the nonadjacent side of the other length of film over the portion of the path and drops sharply to the ambient pressure near both longitudinal edges of the other length of film; and
transferring the information from the one film length to the other film length in the portion of the path.

24. The method of claim 23, in which the transverse profile of the static fluid head is convexed, the pressure dropping gradually from the film center edgeward.

25. The method of claim 23, in which the producing step comprises forming an enclosure for fluid over the nonadjacent side of the other length of film, forming constricted passages for fluid escape from the enclosure near the longitudinal edges of the other length of film; and the other fluid under pressure into the enclosure.

26. The method of claim 23, in which the guiding step guides the lengths of film so they are aligned with each other over the portion of their paths and the producing step comprises forming an enclosure for fluid over the nonadjacent side of the other length of film, forming a first constricted passage for fluid escape from the enclosure near one longitudinal edge of the other length of film, forming a second constricted passage for fluid escape from the enclosure near the other longitudinal edge of the other length of film, the second passage being narrower and set further back from the film edge than the first passage to balance the lateral forces exerted on the lengths of film by the fluid escaping from the enclosure through the passages.

27. The method of claim 26, in which the supporting step comprises forcing fluid under pressure through a platen of microporous material to form a fluid cushion between one surface of the platen and the nonadjacent side of the one length of film.

28. A method for supporting a length of film over a portion of its path, the method comprising the steps of:
guiding the length of film along a path;
supporting the portion of the length of film on one side; and
producing a high superatmospheric static fluid head that communicates with the other side of the length of film and drops sharply near both longitudinal edges of the length of film along the same portion of the film length.

29. A method for contact printing an image appearing on a length of transparent master film to a length of unexposed film, the method comprising the steps of:
guiding the lengths of film so they are aligned with and adjacent to each other over a portion of their paths;
supporting a portion of the nonadjacent side of one of the lengths of film over the portion of the path;
forming an enclosure for fluid over the nonadjacent side of the other length of film over the portion of the path;
introducing fluid under pressure into the enclosure to produce a high fluid head that exerts a force on the other length of film to hold the films in intimate contact with each other over the portion of their paths;
forming constricted passages for fluid escape from the enclosure near the longitudinal edges of the other length of film to produce a sharp drop in the force exerted on the film;
exposing the unexposed film to the master film at a point on the portion of the paths in the presence of light to transfer the image on the master film to the unexposed film; and
transporting the lengths of film past the exposing point.

30. The method of claim 29, in which the supporting step comprises the step of forcing fluid under pressure through a microporous platen to form a fluid cushion between one surface of the platen and the nonadjacent side of the one length of film.

31. The method of claim 30, in which one of the passages for fluid escape is narrower and set further back from the film edge than the other passage to balance the lateral forces exerted on the lengths of film by the fluid escaping from the enclosure through the passages.

32. The method of claim 29, in which the constricted passages are set back from the longitudinal edges of the other length of film.

33. The apparatus of claim 6, in which the transverse sides are spaced upwardly and outwardly from the edges of the film length.

34. The apparatus of claim 6, in which the transverse sides are spaced upwardly and inwardly from the edges of the film length.

35. The apparatus of claim 34, in which one transverse side is spaced inwardly from the edges of the film length further than the other transverse side and is longer than the other transverse side to balance the lateral forces exerted on the film length by the fluid escaping from the housing along the film edges.

36. The apparatus of claim 1, in which the directing means and the housing are adapted so the static head in the space between the housing and the other side of the film has a transverse convexed profile, the static pressure dropping gradually from the film center edgeward.

* * * * *